United States Patent

Yasuda et al.

[15] 3,699,619

[45] Oct. 24, 1972

[54] METHOD FOR MANUFACTURING A MAGNETIC THIN FILM MEMORY ELEMENT

[72] Inventors: Nobuaki Yasuda, Zushi-shi; Takenobu Ogawa, Kawasaki-shi; Yoshio Murakami, Yokohama; Iwao Higashinakagawa, Kawasaki-shi; Syozo Takeno, Yokohama; Norio Tanaka, Tokyo, all of Japan

[73] Assignee: Tokyo Shibaura Electric Co., Ltd., Kawasaki-shi, Japan

[22] Filed: July 29, 1970

[21] Appl. No.: 59,293

[30] Foreign Application Priority Data

July 30, 1969 Japan ......................44/59790

[52] U.S. Cl.........29/604, 340/174 QA, 340/174 PW, 340/174 BC

[51] Int. Cl.................................................H01f 7/06

[58] Field of Search...29/604; 340/174 QA, 174 PW, 340/174 BC

[56] References Cited

UNITED STATES PATENTS

| | | | |
|---|---|---|---|
| 3,553,648 | 1/1971 | Gorman et al. | 29/604 X |
| 3,585,616 | 6/1971 | Mazzeo | 340/174 BC |
| 3,392,441 | 7/1968 | Bartkus et al. | 29/604 |
| 3,521,252 | 7/1970 | Oshimaet al. | 340/174 PW |
| 3,581,293 | 5/1971 | Fedde et al. | 340/174 PW |
| 3,600,800 | 8/1971 | Akachi et al. | 29/604 |

*Primary Examiner*—Charles W. Lanham
*Assistant Examiner*—Carl E. Hall
*Attorney*—Flynn & Frishauf

[57] ABSTRACT

A magnetic thin film memory element ad a method for manufacturing the same, which comprises the steps of forming a magnetic keeper for concentrating a magnetic flux generated by a current flowing through word lines beside said word lines, forming a plurality of digit lines closely intersecting said word lines through a first insulator, which is encircled by a magnetic thin film forming a closed flux path, and forming a conductive layer contacting the digit lines through a second insulator.

6 Claims, 24 Drawing Figures

METHOD FOR MANUFACTURING A MAGNETIC THIN FILM MEMORY ELEMENT

BACKGROUND OF THE INVENTION

The present invention relates to an extremely high density magnetic thin film memory element and a method for manufacturing the same.

In the prior art magnetic thin film memory element, it has been customary to coat a metallic substrate with a first layer of insulating material, arrange a number of digit lines each of which is surrounded by a magnetic thin film on said insulating layer and coat the magnetic thin films with a second layer of insulating material. On the latter insulating layer there are arranged a number of word lines transversely to the digit lines, and on the word lines there are attached a magnetic keeper consisting of a ferrite plate, which serves to concentrate the magnetic field produced when currents flow through the word lines, into the vicinity of the word lines.

In the memory element as described above, in order to attain a sufficient keeper effect it is necessary that the keeper be disposed on the word lines so as partly to surround them, namely, with that part of each word line facing the digit line left out, and the distance between the keeper and the magnetic thin film is usually less than 1 micron. This requires that the permeability of the keeper material itself as well as equivalent permeability defined by the gap between the magnetic thin film and the keeper should be high. On the other hand, since the ferrite keeper is highly rigid and less flexible, the gap between the keeper and the magnetic thin film is not uniform. Especially for the sake of roughness of the metallic substrate and the ferrite keeper it is difficult to maintain the accuracy of, say, 1 micron.

It has also been proposed to provide a flexible keeper instead of the rigid ferrite keeper, on which the word lines are arranged, to combine it with the digit lines. In this case, however, mutual positioning of the word lines and the digit lines is difficult and hence it is still impossible to provide a high accuracy, high density magnetic thin film memory element.

SUMMARY OF THE INVENTION

It is an object of the present invention to provide a high density magnetic thin film memory element and a method for manufacturing the same with ease and with high reproducibility.

DESCRIPTION OF THE PREFERRED EMBODIMENTS

Figure 1:
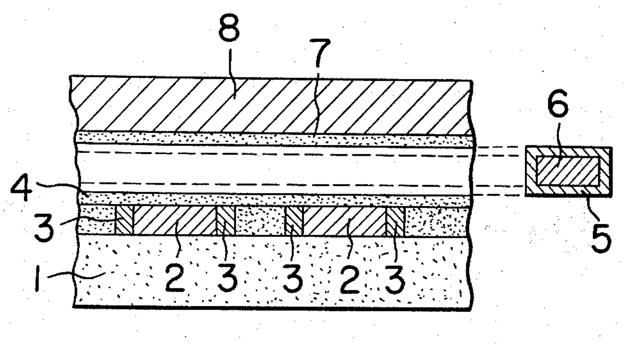
FIG. 1 is a cross-sectional view of a preferred embodiment of a magnetic thin film memory element in accordance with the present invention.

The present invention will now be described and explained in more detail referring to the accompanying drawings. In FIG. 1, a ferrite substrate 1 of high permeability has its one surface smoothly finished, on which a first block of lines comprises strip lines of high conductivity 2. On both sides of the conductors 2 are attached keepers 3, 3 of high permeability material, such as Permalloy. There is deposited an insulating layer 4 so as to cover the valley and surface portions of each conductor 2. Further on said insulating layer 4 is mounted a second block of lines, each of which consists of a good conductor 6 having its peripheral surface coated with a magnetic thin film 5. Arranged on an insulating layer 7 covering the second block of lines is a ground plane 8 consisting of high conductive material.

Figure 2:
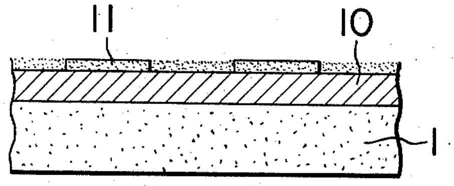
FIGS. 2 to 5 show the steps for manufacturing the memory element of FIG. 1.
Figure 3:
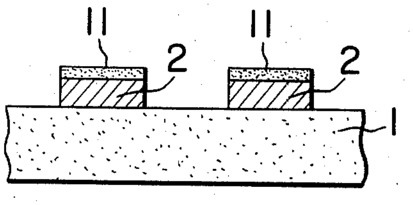
Figure 4:
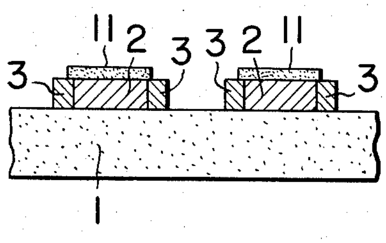
Figure 5:
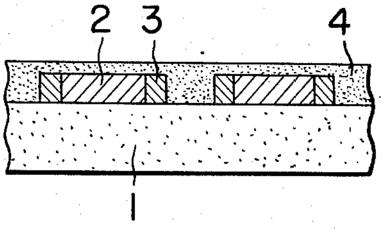

The magnetic thin film memory element as described above may be manufactured through the steps illustrated in FIGS. 2 to 5. First, as shown in FIG. 2, a copper layer 10 is deposited by evaporation technique on one smooth surface of the ferrite substrate 1. Then, a photo-resist layer is applied onto the copper layer 10 and it is then selectively removed to leave strips of photo-resist layer 11, and the first block of lines are formed, as shown in FIG. 3, by etching. The assembly is then plated with a high permeability material such as Permalloy. Since no metallic layer is formed on the ferrite during this plating process, the layer of high permeability material is deposited only to the sides of the first block of conductors, which depositions serve as keepers 3, 3 (See FIG. 4.). Alternatively, the keepers 3, 3 may be formed by providing a layer of high permeability which fills the valley portions between the conductors and dividing the resultant assembly by etching. Then, the insulating layer 4 is applied, as shown in FIG. 5, on which the second block of conductors are arranged by a conventional manner to form the magnetic thin film memory element of FIG. 1.

With the magnetic thin film element as described above, the sides of the conductors in the first block of lines or word lines carry keepers of high permeability, which improve the concentration of magnetic flux into the second block of lines or digit lines.

Figure 6:
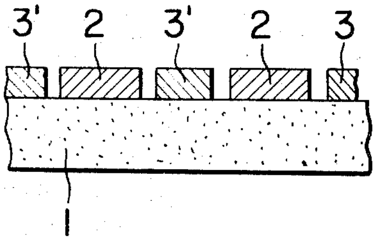
FIG. 6 partly shows a modification of FIG. 1.

In FIG. 6, a modification of the preferred embodiment of the invention is shown, in which the keeper 3′, instead of being deposited on the sides of the first block of lines, is formed as a strip by evaporation between the adjacent lines and spaced from any of the lines. The parts of the memory element formed thereon are identical to those in the previous embodiment. With this structure, the concentration of magnetic flux into the second block of conductors is relatively good as in the previous embodiment and no manufacturing difficulties are encountered.

In the above embodiments, there are provided keepers 3 or 3′ on both sides of the word lines 2 formed on the substrate. Alternatively, the word lines may be formed within channels engraved in the substrate, with the magnetic keeper partly surrounding the word lines.

Figure 7:
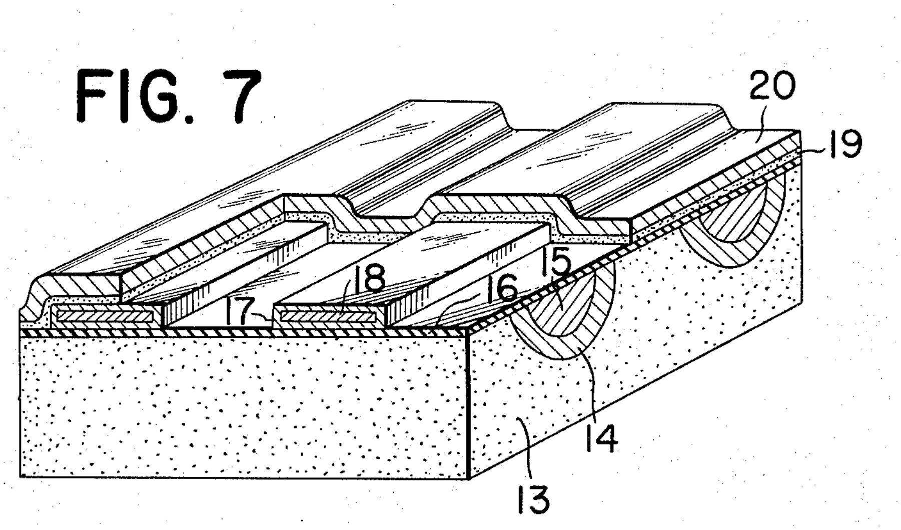
FIG. 7 is a perspective view, partly broken away, of the memory element of another embodiment.

FIG. 7 shows an embodiment in which Permalloy is used as a magnetic keeper and the word lines 15 partly surrounded by the Permalloy layer 14 are embedded in the channels engraved in the polyimide resin layer 13. The Permalloy layer 14 and a portion of the word lines 15 are in flush with the upper surface of the polyimide resin layer 13, on which surfaces the digit lines 18 encircled by the magnetic layer 17 are arranged transversely to the word lines through an insulating layer 16. On the digit lines 18 there are arranged a further insulating layer 19 and a conductor layer 20.

Now, a method for manufacturing the magnetic thin film memory element of the above embodiment of FIG. 7 will be explained with reference to FIGS. 8 to 15.

Figure 8:
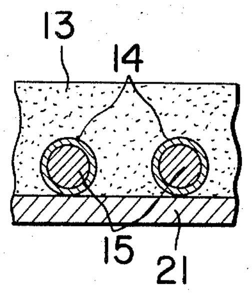
FIGS. 8 to 15 illustrate the steps for manufacturing the memory element of FIG. 7.

As shown in FIG. 8, a predetermined number of copper wires 15 each having circular cross-section and being clad with Permalloy layer 14 are arranged on the substrate 21 with flat surface at a preselected pitch, and then polyimide resin is molded thereon to form the insulating layer 13.

Figure 9:
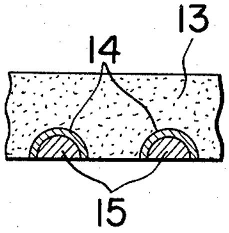
Figure 10:
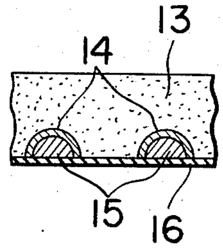

The insulating layer 13 is then stripped off from the substrate 21 and the face which has been in contact with the substrate 21 is planed until the cross-section of the copper wires 15 presents semi-circular shape and elongated longitudinal cross-sectional faces of the copper wires having clad layer on both sides thereof are exposed. (FIG. 9)

Figure 11:
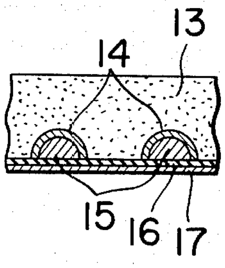
Figure 12:
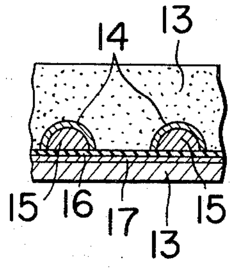
Figure 13:
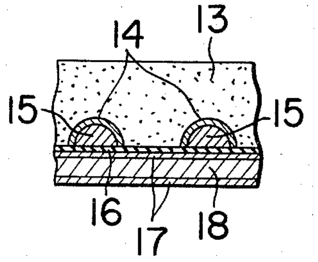

On the planed surface a refractory insulating coating 16 is deposited (FIG. 10), on which coating there are arranged the digit lines 18 encircled by magnetic thin film 17 extending transversely to the word lines 15, by evaporation or electroplating and photoetching techniques (FIGS. 11 to 13).

Figure 14:
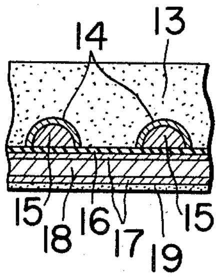
Figure 15:
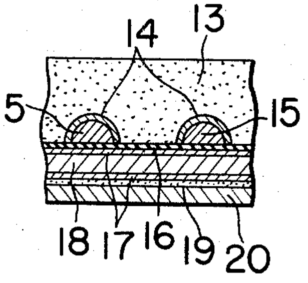

Then, the insulating coating 19 of polyimide resin is applied thereon as shown in FIG. 14, and a metallic layer 20 is formed thereon by any one of evaporation, electroplating and plating techniques, the layer corresponding to a metallic substrate in a conventional memory element.

With the memory element thus formed, the Permalloy layers 14 clad on the peripheral surfaces of the word lines 15, which layers 14 serve as magnetic keeper, completely encircle the word lines 15 and are in complete contact with them. Furthermore, since the digit lines 18 are formed, through the insulating coating 16, on the planed surface which is formed by planing away the insulating layer until the word lines 15 and the keepers 14 are exposed, the keepers 14 and the digit lines 18 are arranged very closely to each other. This means that there exists no irregular contact between the metallic substrate and the keeper as has been encountered in the prior art element using the metallic substrate and rigid keepers. Thus, the keeper effect is most enhanced and high performance of memory is provided.

With the above preferred embodiment of FIG. 7, besides the above advantages, the distance between the magnetic thin film (closed magnetic path element) on the digit lines and the keepers, and the distance between the digit lines and the word lines can be maintained at a small, constant value at all memory operation points of the memory plane, so that a memory element having uniform output characteristic and low noise and high reproducibility may be provided.

Further, in the memory element constructed in accordance with the above preferred embodiment of FIG. 7, the interconnection of the matrices may be accomplished much more easily than in the prior art element. In some circumstances, no particular connection is needed.

Where the refractory insulating coating 16 is made of polyimide resin as in the above embodiment of FIG. 7, Permalloy may be evaporated onto the coating 16 to form closed magnetic path element for the digit lines so that it presents good uniaxial anisotropy and closed magnetic path may easily be attained to provide a memory element of high density, low noise and uniform characteristic. However, it should be appreciated that the present invention is not limited to the above and any material of the refractory insulating coating may be used.

Also, in the above embodiment of FIG. 7, longitudinally cross-sectional Permalloy-clad wires are used as members forming the keepers and the word lines, but the members are not limited to the above particular structure. For example, any appropriate members such as Permalloy-plated wires, Permalloy-plated wires having square cross-section may be used.

Figure 16:
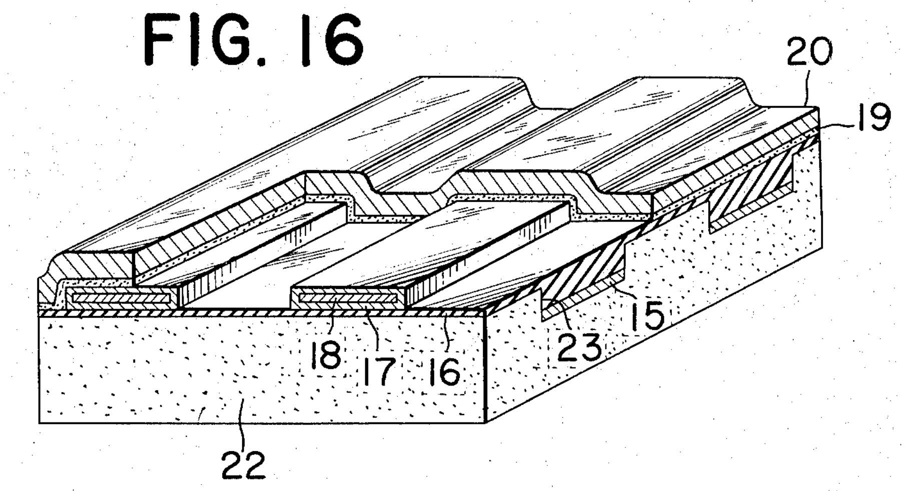
FIG. 16 is a perspective view, partly broken away, of the memory element of further embodiment.

In FIG. 16, ferrite 22 is used as the substrate, in which the channels 23 are engraved and the word lines 15 are arranged at the bottoms of the channels 23 and the entire surface of the substrate 22 including the channels is coated with the insulating layer 16. In other respect, the embodiment of FIG. 16 is similar to that of FIG. 7.

Figure 17:
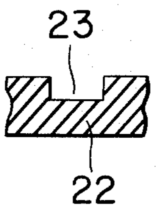
FIGS. 17 to 20 illustrate the steps for manufacturing the memory element of FIG. 16.
Figure 18:
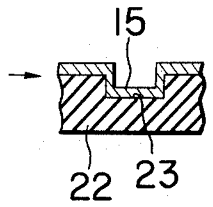
Figure 19:
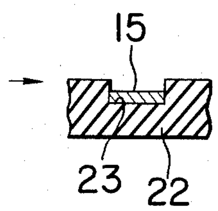

The above element may be manufactured through the steps illustrated in FIGS. 17 to 20. As shown in FIG. 17, the channels 23 of predetermined width and depth are provided on one surface of the ferrite substrate 22 at a predetermined pitch. Then, on the surface on which the channels 23 are formed there is provided a copper layer 15 by evaporation, electroplating, plating or the like (FIG. 18). The copper layer 15 is then removed, except the bottom area of the channel 23, by well-known etching technique to form the word lines 15 (FIG. 19).

Figure 20:
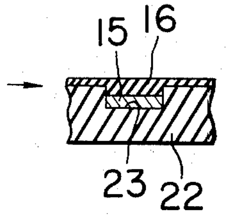

Next, the insulating layer 16 of synthetic resin such as polyimide is applied to cover said one surface of the substrate 22 and the surfaces of the word lines 15 in the channels (FIG. 20). The subsequent steps are same as those illustrated in FIGS. 11 to 15.

In the element in accordance with the above embodiment of FIG. 16, the ferrite substrate 22 which serves as a keeper is used as a base, on which each of the parts of the element is deposited. Thus, bad contacts between the keeper and the word lines and between the keeper and the digit lines closed by magnetic path elements do not exist and hence the disadvantages of the prior art element associated with the bad contact are completely eliminated.

Furthermore, as apparent from the above structure and the manufacturing methods, since the distances between the word lines and the digit lines are uniform at all points in the matrix, the memory elements of uniform output characteristic, low noise and high reproducibility are provided.

In the above embodiment of FIG. 16, the insulating layer 16 is formed of polyimide resin to facilitate the formation of Permalloy layer by evaporation, although the material of the insulating layer is not limited to the above particular resin.

Figure 21:
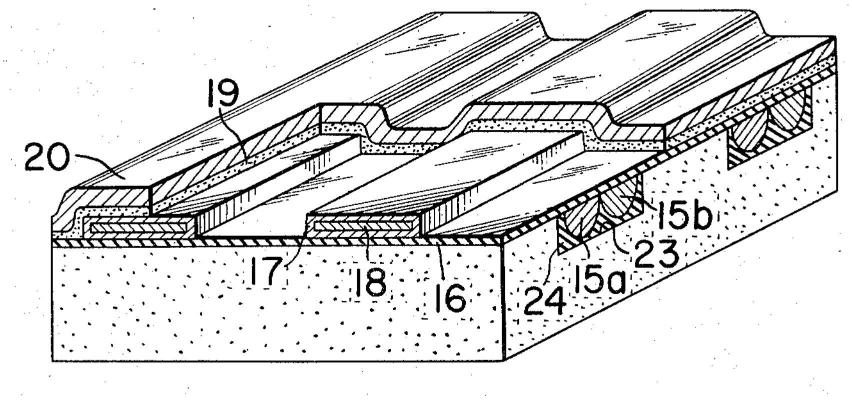
FIG. 21 shows a perspective view, partly broken away, of the memory element of still further embodiment.

FIG. 21 illustrates another embodiment in which ferrite is used as the substrate 22 and two word lines 15*a*, 15*b* are juxtaposed in the channel 23 formed in the ferrite substrate 22 and the insulating resin 24 is applied to insulate the lines from each other.

Figure 22:
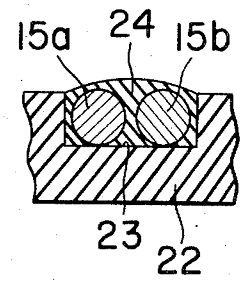
FIGS. 22 to 24 illustrate the steps for manufacturing the memory element of FIG. 21.
Figure 23:
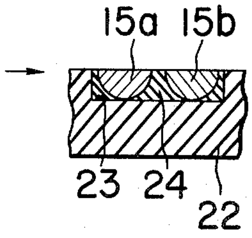
Figure 24:
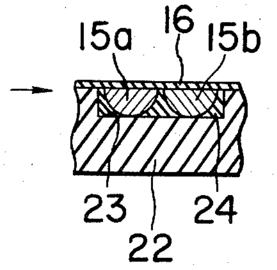

The above element may be manufactured through the steps illustrated in FIGS. 22 to 24. As shown in FIG. 22, a plurality of channels 23 having predetermined depth and width are engraved on one surface of the substrate 22 at a predetermined pitch.

Then, a pair of polyimide coated copper wires 15*a*, 15*b* each having a diameter slightly larger than the depth of the channels 23 are juxtaposed in each one of the channels 23. The polyimide resin 24 is then poured into the channels 23 and solidified to fixedly secure the copper wires 15*a*, 15*b* within the channels.

The said one surface of the substrate 22 is planed until the cross-sections of the copper wires 15*a*, 15*b* become semi-circular shape to form the word lines 15*a*, 15*b* (FIG.23).

The insulating layer 16 of polyimide resin or the like is applied on the planed surface. The subsequent steps using evaporation, electroplating or plating as deposition means and photoetching techniques as removing means are similar to those in the previous embodiment of FIG. 16.

As described above, since the word lines are formed by pairs of fine lines in this embodiment of FIG. 21, the width of the word lines is increased and effective bit area is also increased and thus the output is increased. Furthermore the tolerance of the distance between the word lines and the digit lines is improved and the magnetic flux produced by the current flowing through the word lines may be effectively concentrated into the keeper.

The number of the fine wires forming the word line is not limited to two and any larger number of wires may be used. It is also possible to spirally arrange the word lines to reduce required driving current.

The metallic layers 8, 20 shown in FIGS. 1, 7, 16 and 21 provide a so-called mirror image effect. Thus, a magnetic flux produced by passing an electric current to digit lines is concentrated on magnetic paths formed between the insulating films 7, 19 and the digit lines. The magnetic flux in said magnetic paths has a density equivalent to that which would be obtained if a current having the same magnitude as that introduced through digit lines passed through the opposite side of said digit lines with the insulating films 7, 19 interposed between the magnetic paths and the metallic layers 8, 20. Thus the magnetic flux produced by said current is concentrated to the magnetic path as is known as the mirror image effect.

We claim:

1. A method for manufacturing a magnetic thin film memory element comprising the steps of:

embedding and juxtaposing spaced, highly conductive word line wires covered with high permeability keeper material in a plane substrate at a predetermined pitch, said keeper material concentrating magnetic flux produced by current flowing in said word lines;

planing at least said substrate and said high permeability keeper material coating along said highly conductive wires to form a substantially flat surface which includes said coating and said highly conductive wires;

forming a plurality of digit lines, each surrounded by a magnetic thin film to produce a closed flux path, and arranging said digit lines orthogonally to, and upon, said word lines with a first insulator interposed between said word and digit lines; and forming a conductive layer on said digit lines with a second insulation interposed between said conductive layer and said digit lines for providing a mirror image effect.

2. A method for manufacturing a magnetic thin film memory element as defined by claim 1 wherein said planing step includes planing said highly conductive wires such that said substantially flat surface includes a flat portion of said highly conductive wires.

3. A method for manufacturing a magnetic thin film memory element as defined by claim 1 wherein said conductive word line wires are in intimate contact with said high permeability keeper material covering.

4. A method for manufacturing a magnetic thin film memory element as defined by claim 1 wherein said high permeability keeper material is Permalloy.

5. A method for manufacturing a magnetic thin film memory element as defined by claim 1 wherein said step of embedding said covered conductive word line wires comprises molding said covered wires in a substrate material.

6. A method for manufacturing a magnetic thin film memory element as defined by claim 1 wherein said planing step includes planing said highly conductive wires, said coating and said substrate until said wires present a substantially semi-circular shape in cross-section.

* * * * *

PO-1050 (5/69)

UNITED STATES PATENT OFFICE
CERTIFICATE OF CORRECTION

Patent No. 3 699,619 Dated October 24, 1972

Inventor(s) Nobuaki YASUDA et al

It is certified that error appears in the above-identified patent and that said Letters Patent are hereby corrected as shown below:

Page 1, In the heading add the following additional priority data information:

--July 30, 1969 Japan............59791/69
July 30, 1969 Japan............59792/69
October 8 1969 Japan............80102/69--.

Signed and sealed this 24th day of April 1973.

(SEAL)
Attest:

EDWARD M. FLETCHER, JR.
Attesting Officer

ROBERT GOTTSCHALK
Commissioner of Patents